Apr. 17, 1923.
H. D. ELLIOTT
1,452,110
TRANSPLANTING DEVICE
Filed Dec. 22, 1921
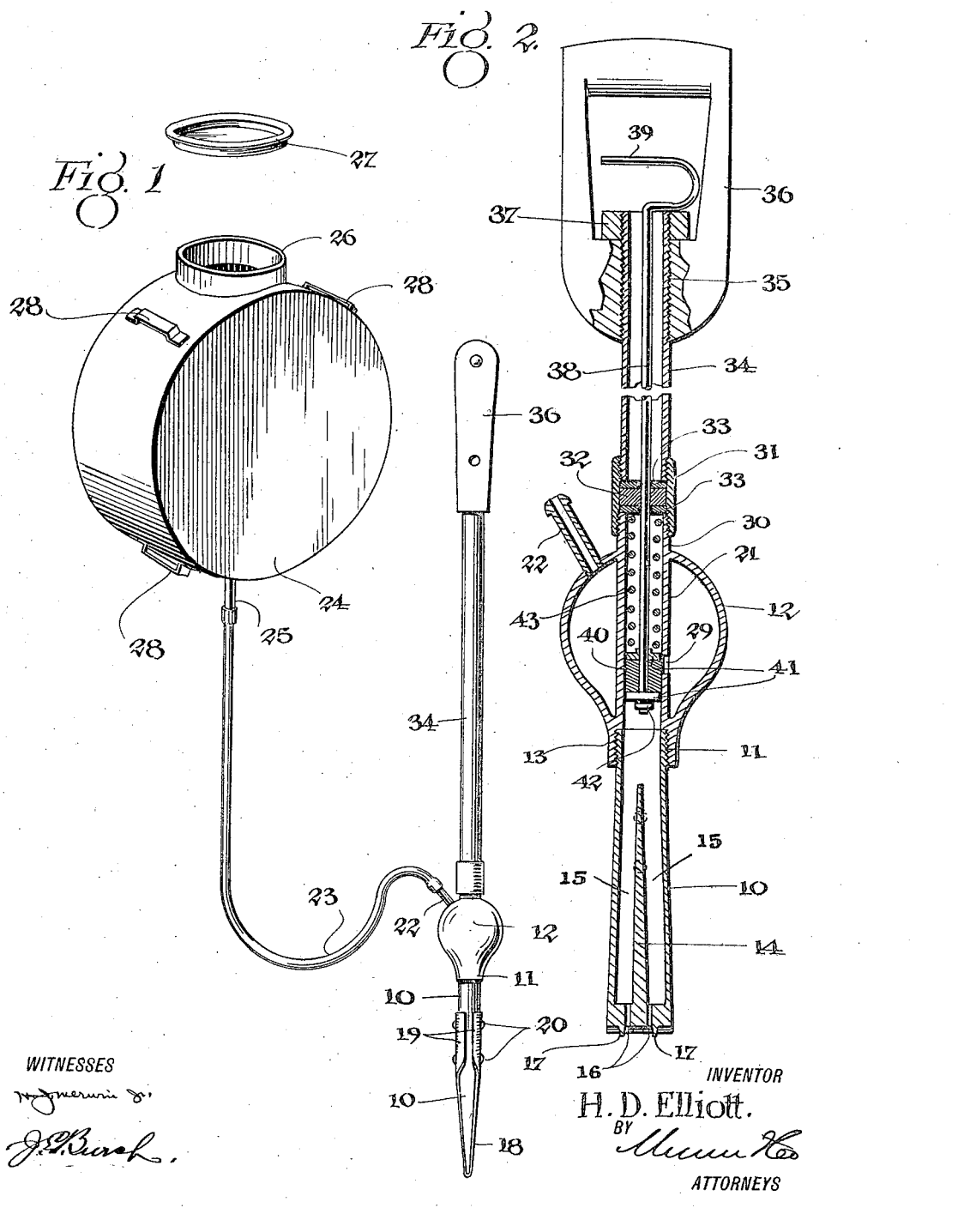
WITNESSES
INVENTOR
H. D. Elliott.
BY
ATTORNEYS Patented Apr. 17, 1923.

1,452,110

UNITED STATES PATENT OFFICE.

HENRY DEMASCUS ELLIOTT, OF TABOR, NORTH CAROLINA.

TRANSPLANTING DEVICE.

Application filed December 22, 1921. Serial No. 524,272.

*To all whom it may concern:*

Be it known that I, HENRY D. ELLIOTT, a citizen of the United States, and resident of Tabor, in the county of Columbus and State of North Carolina, have invented certain new and useful Improvements in Transplanting Devices, of which the following is a specification.

This invention relates to a transplanter, and more particularly to a device adapted for planting potatoes, sprouts, vines and the like, and the object thereof is to provide a simple, novel and efficient device of this character which may be easily operated, which is light, strong and durable.

A further object of the invention is to provide a device in the nature of a handled implement like a shovel, spading fork or the like, and which will serve to form the desired depression or cavity in the ground to receive the plant and to supply the necessary water or fertilizing mixture to assist the plant in taking root and to insure proper growth of good healthy producing plants.

Other and further objects of my invention will be apparent to persons skilled in the art from a consideration of the following description taken in conjunction with the accompanying drawing, in which—

Figure 1 is a perspective view partly in elevation of the improved transplanter, and Figure 2 is an enlarged sectional front elevation thereof.

Referring to the drawing in detail, in which like reference characters designate corresponding parts throughout the several views and in which for purposes of illustration is shown the preferred embodiment of the invention, the improved transplanter for potato sprouts, vines and the like consists of a tapered chisel shaped point 10 to which is connected as by means of the threads 11, a substantially globular enlargement 12, the latter having a reduced portion or neck 13 internally threaded to receive the externally threaded portion of the open upper end of the tubular point as shown. The point is provided with a central partition 14 which terminates below the upper end thereof and in this manner two internal chambers 15 are provided having discharge openings 16 for the water or fertilizing fluid, the tapered and sharpened lower end of said point being provided with a pair of spaced prongs or teeth 17 engaged through apertures in a V-shaped shield plate 18 bent around the same and secured at the substantially semicircular upper portions thereof designated 19 as indicated at 20, this providing means for protecting the point and insuring of the discharge of fluid at the spaces between the sides of the point and the sides of the shield.

Within the globular portion 12 is a tubular portion 21 and said globular portion is provided with a nipple 22 for the attachment of a flexible rubber pipe, tube or the like 23 adapted to be connected with a suitable tank 24 containing the water or other fluid. The tank is provided with a nipple 25 for this purpose and is preferably relatively flat and of cylindrical outline in the shape of a drum, provided with a neck portion 26 adapted to receive a closure cap 27 constituting a filling plug for the tank. The tank is also provided near the top and near the bottom with straps or offset metal strips in the form of loops 28, four of which are provided to receive suitable straps or a suspension device, by which the tank may be suspended from the shoulders of the operator or farmer, thus permitting the device to be easily transported from place to place.

The tube 21 is provided with an inlet or discharge opening 29 within the globular portion 12 constituting an auxiliary tank or reservoir and the tube extends above said globular portion to provide an externally threaded neck portion 30 to which a nipple 31 is threaded or otherwise detachably connected. Disposed against the upper end of the neck portion 30 and within the nipple is a partition or bushing consisting of an intermediate disk 32 and top and bottom disks 33 preferably of metal or washers, these parts being apertured and retained in position by the engagement of the internally threaded outer end of the nipple with the externally threaded lower end of the elongated tubular shank 34, the upper end thereof being threaded or otherwise provided as shown at 35 for attachment to a handle 36 of the type substantially like that provided on shovels or similar implements. The handle is retained in position by a nut 37 engaged on the upper end of the shank and with the handle as shown. A plunger rod 38 extends through the shank and the bushing and in the loop of the handle is provided with a rebent gripping portion 39 while the lower end thereof carries a head or valve 40 suitably retained in position and in the form of a rubber cylinder or plug with upper and lower plates or washers 41 retained in position by a nut 42, the valves or enlargements cooperating with the opening or apertures 29 in order to control the escape of the fluid through the point.

Positioned between the wall or partition 32 and the valve is an expansible coiled spring 43 which serves to hold the valve in position to close the opening 29 and in the operation of the device, in setting potatoes, sprouts or anything in vines, the operator grasps the handle by which the device is carried and forces the same into the prepared soil, thereby producing the desired recess or hole for receiving the plants. The fork or grasping portion 39 is then grasped with one hand and the valve lifted by pulling upwardly on the same through the medium of the plunger or stem 38, thus opening the valve and permitting the water or fluid to escape through the opening 29 from the tank by way of the tube 23 and the globular portion or auxiliary tank or reservoir 12, thus discharging the same through the openings or outlet apertures 16 into the recess or hole. In this manner, when the plant is set, its growth and the production of a healthy plant will be facilitated.

In view of the foregoing it is thought that the operation of the device will be readily understood and in view of the simplicity and practical value that it will readily commend itself to those skilled in the art.

Having thus described my invention, what I claim is:—

1. In a device of the character described, a tubular stock having an orifice intermediate its ends and in the side wall thereof communicating with a liquid chamber, a spring pressed valve member within the tubular stock, a rod having its one end connected with said valve member and its other end formed with a lateral projection adapted to seat upon the upper end of the stock and hold the valve member in position for closing said orifices, and means whereby said valve member may be lifted to open said orifice.

2. In a device of the character described, a tubular stock having an orifice in its walls occurring intermediate its ends and communicating with a liquid chamber, a spring pressed valve member within the tubular stock, a rod having its one end connected to said valve member and its other end formed with a substantially U-shaped and laterally extending projection which is adapted to seat upon the upper end of the tubular stock and hold the valve member in position for closing said orifice and also adapted to serve as a handle for lifting said valve member to open said orifice.

3. In a device of the character described, a liquid injecting section comprising a tubular member, a division wall extending longitudinally thereof, an end closure for the lower end of said section adapted to form two separate compartments with said division wall, and said end closure having a plurality of orifices communicating with said compartments of the tubular member, and projections formed upon the lower face of the lower end closure for the purpose described.

HENRY DEMASCUS ELLIOTT.